May 11, 1965
L. P. LARSON
3,182,887
CONTAINER
Filed July 29, 1963
5 Sheets-Sheet 1
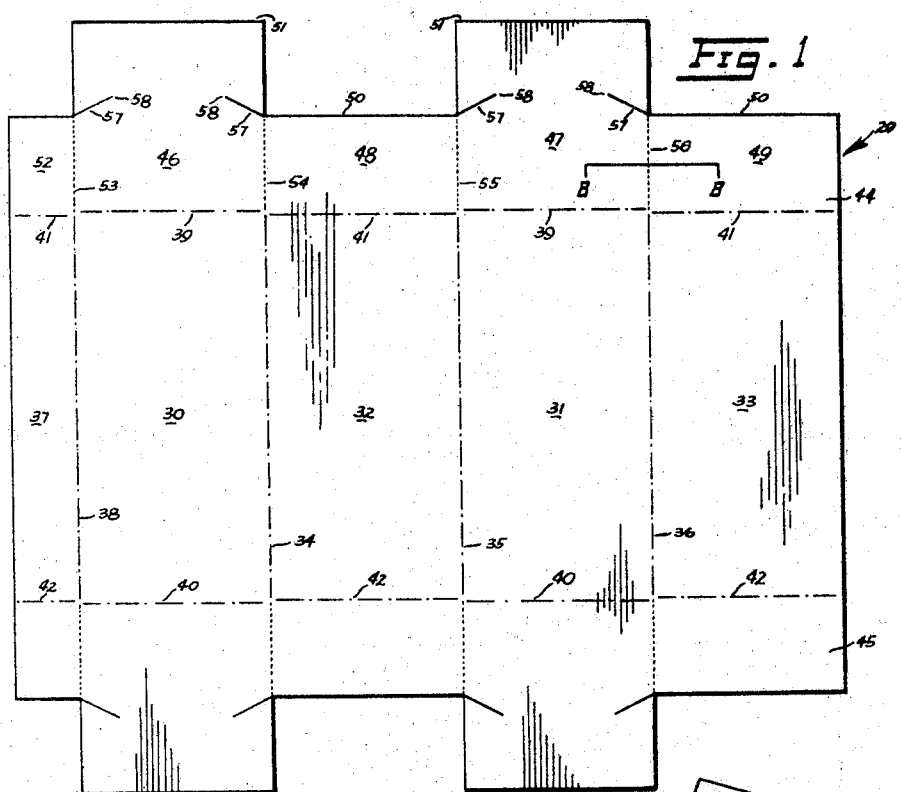
Fig. 1
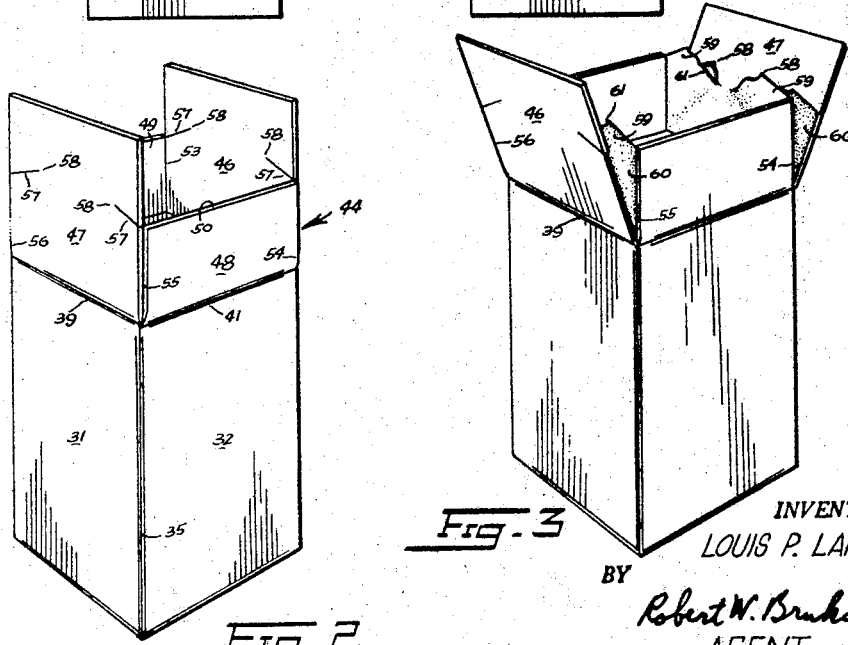
Fig. 2
Fig. 3
INVENTOR.
LOUIS P. LARSON
BY Robert W. Brukardt
AGENT.

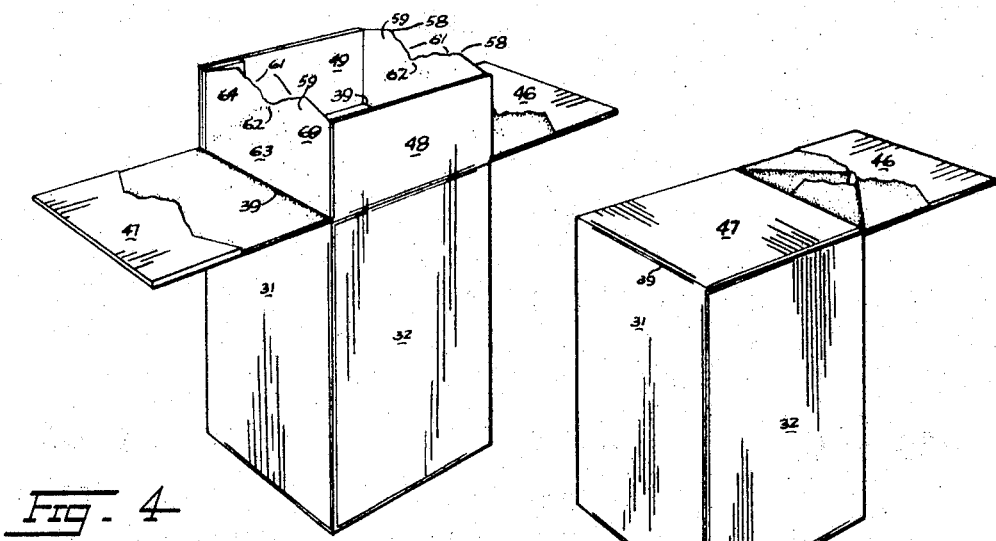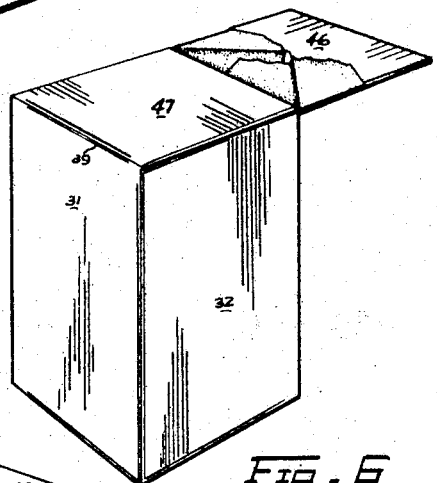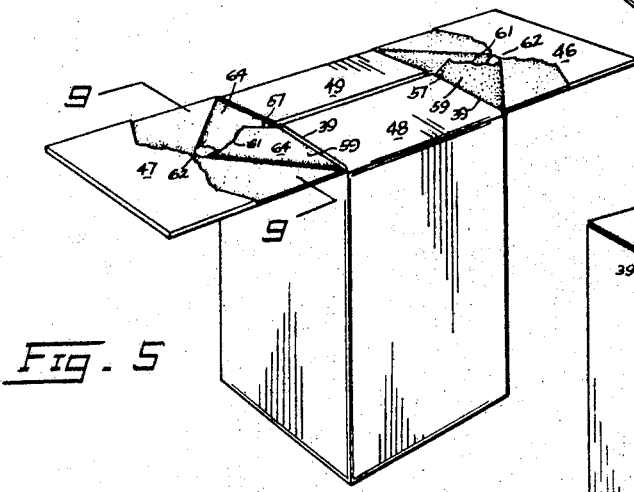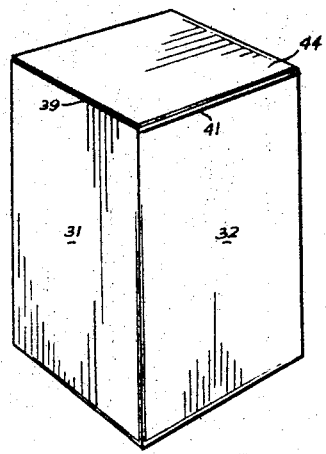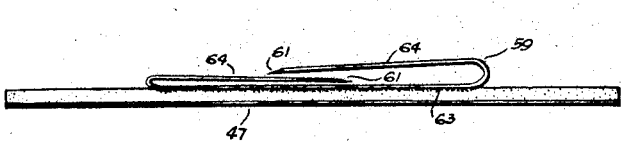

May 11, 1965  L. P. LARSON  3,182,887
CONTAINER
Filed July 29, 1963  5 Sheets-Sheet 3

INVENTOR.
LOUIS P. LARSON
BY
Robert W. Brukardt
AGENT

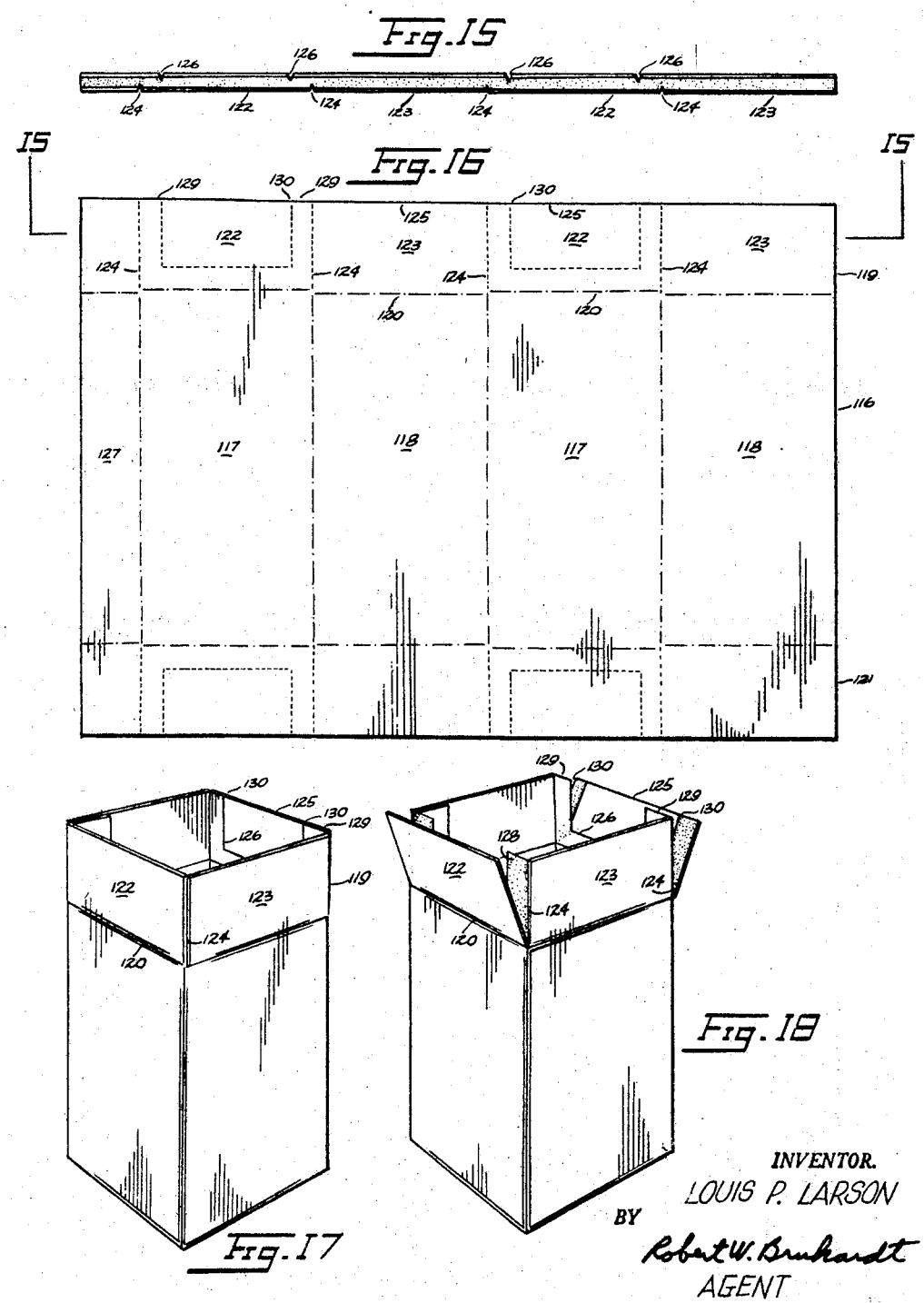

May 11, 1965   L. P. LARSON   3,182,887
CONTAINER
Filed July 29, 1963   5 Sheets-Sheet 5

INVENTOR.
LOUIS P. LARSON
BY
Robert W. Burkardt
AGENT

United States Patent Office 3,182,887
Patented May 11, 1965

3,182,887
CONTAINER
Louis P. Larson, Glendale, Mo., assignor to Crown Zellerbach Corporation, San Francisco, Calif., a corporation of Nevada
Filed July 29, 1963, Ser. No. 298,085
9 Claims. (Cl. 229—37)

This invention relates to an improvement in sealed cartons for siftable or flowable commodities and deals particularly with cartons formed from a unitary foldable blank of fiberboard or the like which includes a sealed end closure to prevent leakage or contamination of the contents of the container.

Heretofore cartons for the present purpose have generally been constructed with separate liners or bags therein in order to gain an effective seal to protect the container contents or in the alternative, certain cartons have been proposed with purported sift proof characteristics wherein webs or tufts of the materials comprising the carton blank were formed in the corners of the cartons at the corner junctures of the end closure flaps. Such tear corner cartons, as they have been termed, have generally utilized constructions wherein the side edges of the carton flaps were in part defined by free cut edges and in part by a partly severed or cut scored portion adjacent the hinge connection of the flaps to the top edges of the carton walls. While such constructions have afforded a degree of protection they have failed to provide a positive seal which would effectively eliminate sifting of finely divided powder materials and these prior art constructions are further limited in that they are not adapted to the even more stringent requirements of providing hermetic or liquid tight closures of such cartons.

Accordingly, the present invention is intended to provide an effectively sealable carton construction formed from a unitary foldable blank of fibreboard or the like wherein the foldable blank has the property of being delaminable. Further the invention will provide a carton with integral delaminable sealing elements which may be initiated and controlled by provision of novel lines of weakness in the carton's surfaces. A further object is to provide cartons of the described character that are economical to manufacture and use.

These and other objects and novel features of the invention will be more clearly and fully set forth in the following specification wherein exemplary embodiments of the invention are described.

In the drawings:

FIGURE 1 is a plan view of a carton blank constructed in accordance with the invention;

FIGURE 2 is a perspective view of a carton formed from the blank of FIGURE 1 partially assembled;

FIGURE 3 is a perspective view of the carton showing the initial stages of the formation of the sealing webs;

FIGURE 4 is a perspective view showing the carton with the sealing webs formed and preparatory to infolding and sealing the carton end closure;

FIGURES 5 and 6 are perspective views showing successive stages of the infolding of the carton closure flaps and attendant sealing webs;

FIGURE 7 is a perspective view showing the completed sealed carton;

FIGURE 8 is an enlarged cross section through line 8—8 of FIGURE 1;

FIGURE 9 is an enlarged cross section through line 9—9 of FIGURE 5;

FIGURE 15 is a cross sectional view through line 15—15 of FIGURE 16;

FIGURE 16 is a plan view of a carton blank showing a still further embodiment of the invention;

FIGURES 17 through 19 are perspective views showing successive stages of the formation of a carton sealed end closure from the blank of FIGURE 16;

Figure 10:
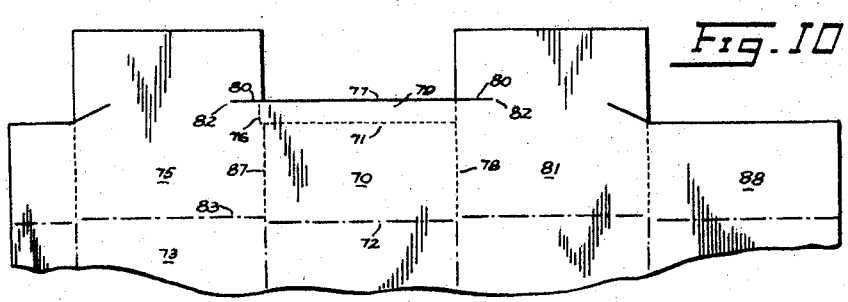
FIGURE 10 is a plan view of a portion of a carton blank showing a further embodiment of the invention.

The unitary blank 29 shown in FIGURE 1 comprises a first pair of opposed wall panels 30 and 31 and an alternate pair of opposed panels 32 and 33 which are connected in serial relation at their side edges by vertical corner scores 34, 35 and 36. A securing tab 37 is foldably connected by vertical corner score 38 to the side edge of wall panel 30. The top and bottom edges of the first opposed pair of wall panels 30 and 31 are determined by flap scores 39 and 40 respectively and the top and bottom edges of the alternate pair of wall panels 32 and 33 are determined by flap scores 41 and 42 respectively as are the corresponding edges of the securing flap 37.

The top and bottom closure sections 44 and 45 may be identical as shown and thus for purpose of brevity only the top section 44 will be described in detail. A first opposed pair of closure flaps 46–47, which will be the outer closure flaps in the erected container, are connected by the flap scores 39 to the ends of the wall panels 30–31 respectively. While an alternate pair of closure flaps 48–49, which will be the inner closure flaps in the erected container, are connected by the flap scores 41 to the ends of the alternate pair of wall panels 32–33 respectively.

In the top closure section 44, the free end edges 50 of the closure flaps 48–49 are each spaced from the respective flap score 41 by a distance approximating one-half the width of the adjacent wall panels 30–31 whereas the end edges 51 of the closure flaps 46–47 are each spaced from the respective flap score 39 by a distance approximating the width of the adjacent wall panels 32–33. The side edges of the flaps 46–49 and the flap portion 52 of the securing tab are integrally connected throughout their adjacent extent by cut scores 53–56 as shown by dotted lines. Thus, these cut scores 53–56 extend from the junction of the flap scores 39 and 41 with the vertical corner scores 34–36 and 38 to the end edges 50 of the alternate pair of closure flaps 48–49. These cut scores sever the exterior surface of the blank and extend partially through the blank to a zone of delamination, as will be described hereinafter, and thus the flaps are integrally connected on the inner surface thereof and throughout their adjacent extent.

The first pair of opposed closure flaps 46–47 are additionally provided with cut lines 57 which extend inwardly from the side edges of the respective flaps and terminate at points 58. These cut lines 58 may extend all the way through the blank material, as indicated by the solid lines in FIGURE 1, for the purpose of simplifying the die cutting operation of the blank. However, it is only necessary that such cut lines 58 sever the interior surfaces of the respective flaps and extend to a depth in the blank commensurate with a zone of delamination. The points of termination 58 of the cut lines 57 in each flap 46–47 are spaced from the respective flap scores 39 by a distance exceeding one-half the width of the respective flap or are otherwise particularly located to determine the conformation of a delaminable sealing web as will be described hereinafter.

To erect the container from the blank 29 the sealing flap 37 and flap portions 52 thereof are secured to the remote edges of the blank and the wall panels 30–33 are folded to tubular relation as shown in FIGURE 2. In this view, the flaps of the closure section 44 are in extended vertical relation and are foldably and integrally connected throughout their adjacent extent at the cut scores 53–56, whereby the exterior surface of these flaps are disconnected, as shown particularly at 55, while the interior surface is foldably integrally connected.

The first step of forming the sealed end closure is shown in FIGURE 3 wherein the first pair of opposed closure flaps 46–47 are moved outwardly about the flap scores 39 whereby there is an initiation of the delamination of sealing webs 59 at the cut scores 53–56 through a delamination zone 60 of the blank material comprising the carton. The upper extremity of the delamination is precisely determined by the cut lines 57 and the successive tearing is particularly controlled thereby in a manner to arrive at the desired sealing web 50 configuration. Thus the cut lines 57 and points 58 are disposed so that torn free edges 61 in each flap naturally extend downwardly and angularly in converging relation from the points of termination 58 of the cut lines.

Going to FIGURE 4 it can be seen that when the first opposed pair of closure flaps 46–47 are moved outwardly to horizontal relation, the sealing webs 59 are completely delaminated therefrom but remain in integral connection with the wall panels at flap score 39 and the alternate pair of closure flaps 48–49 and thus extend completely across the carton. This desired result is gained since the torn free edges 61, stemming as they do from the points of termination 58 spaced more than one-half the width of the flap above the flap scores 39, converge and intersect at a medial zone 62 of the flap which is spaced above the respective flap score 39. As a consequence of the preceding, upon the infolding of the alternate pair of closure flaps 48–49 the sealing webs 59 are folded over on themselves attaining a generally triangular configuration, wherein the medial zone 62 comprises an apical portion and the free edge portions of the webs 59 defined by the cut lines 57 and portions of the torn free edges 61 are in overlapping relation as shown in FIGURE 5.

It is to be noted that in the triangular configuration of the sealing webs 59 there is gained a result whereby the center portion of the web 63 is integrally connected at least at the flap score 39 across the entire width of the carton while the end portions of the web 64 form a substantially coextensive second ply extending entirely across the carton which is integrally joined throughout its extent to the edges of the alternate pair of closure flaps 48–49. Whereby upon the infolding of the closure flap 47, the base portions of the triangularly disposed sealing webs 59 are forced together along the flap score 39 to effectively from a seal across the carton by the fact of the folding and also the pressures of the side edges of the inner flaps 48–49 against the flap scores 39 of the outer flaps.

The resulting completely sealed container is shown in FIGURE 7 wherein the closure section 44 is infolded and sealed.

FIGURE 8 shows a cross-sectional view through line 8—8 of FIGURE 1 whereby it may be seen that the cut score 56, for example, severs the outer surface 68 of the blank material and extends into a delamination zone 60 whereas the inner surface 69 is unimpaired and remains entire at the adjacent side edges of the flaps providing an integral connection therebetween.

FIGURE 9 is a cross section through line 9—9 of FIGURE 5 whereby the two ply construction of the triangular formation of the sealing web is shown with the center portion 63 being disposed adjacent the closure flap 47 while the end portions 64 being in overlapped relation at their torn free edges 61 constitute a second complete ply.

In FIGURE 10 is shown a modification of the carton disclosed in FIGURES 1 through 9. In the sectional view of the blank there is disclosed a modification wherein a sealing fin is provided along the end edge of an inner flap 70. The construction, to attain this feature, may include a cut score 71 disposed in the outer surface of the blank at a distance from the respective flap score 72 corresponding to one-half the width of the adjacent wall panels 73 and 74. The cut score 71 is extended into the adjacent closure flap 75 and is terminated in a tab defining cut score portion 76 in the said adjacent closure flaps 75. The modified inner flap 70 is terminated in a free end edge 77 which together with the cut scores 71 and 76 and the flap side edge defining cut score 78 determines the sealing fin 79. The sealing web defining cut lines 80 in the adjacent flaps 75 and 81 are conveniently aligned with the free edge 77 and extend into the adjacent flaps 75 and 81 to points of termination 82. These points of termination 82, in the manner hereinbefore described, are spaced inwardly from the flap edge and are spaced from the respective flap scores 83 by a distance exceeding one-half the width of said flaps.

Figures 11, 12:
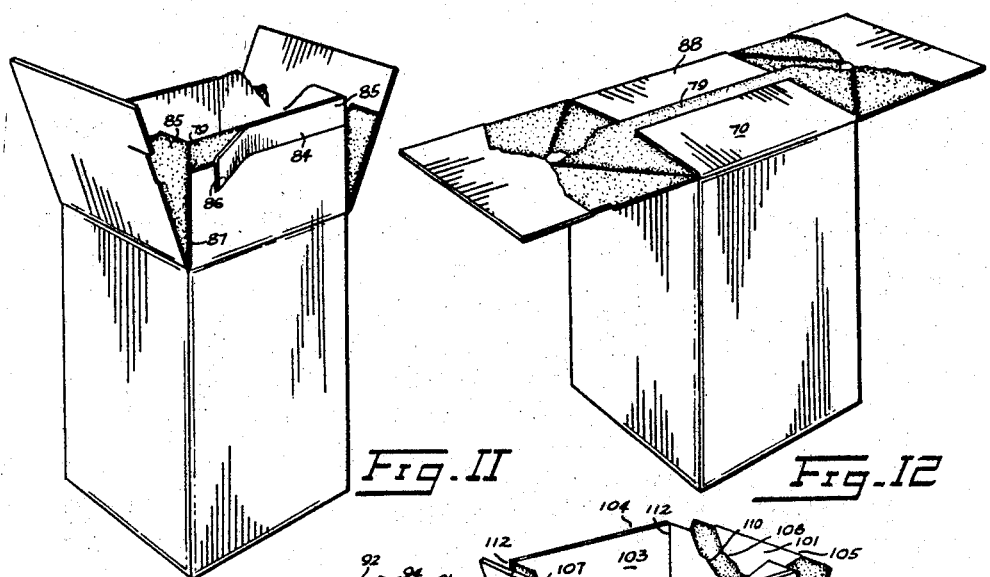
FIGURES 11 and 12 are perspective views showing successive stages of the formation of a carton sealed end closure from the blank of FIGURE 10.

The embodiment of the invention disclosed in FIGURES 10 through 12 is erected and operative in the same manner as the first described embodiment with the exception that the outer surface portion 84 of the sealing fin 79 may be delaminated to provide a relatively thin sealing fin 79 integral with the ends of the respective inner flaps 70 and with the sealing webs 85. The delamination is facilitated by means of the projection of the tab 86 beyond the flap edge 87 when the carton is in tubular wall relation as in FIGURE 11 whereby the tab 86 may be grasped to delaminate and separate the said outer surface portion 84 of the sealing fin 79.

Upon the infolding of the inner flaps 70 and 88 as in FIGURE 12 the sealing fin 79 overlies the end portions of inner flap 80 and therefore seals the line of juncture between the end edges of these flaps and as there is only a minimal thickness of the sealing fin 79 overlapping the opposed flap 88 there is gained a seal at the center line of juncture of the inner flaps without the adverse effect of introducing a full thickness of the carton blank material which would result in a clear channel intervening the closure flaps for possible seepage or sifting of the carton contents.

Figures 13, 14:
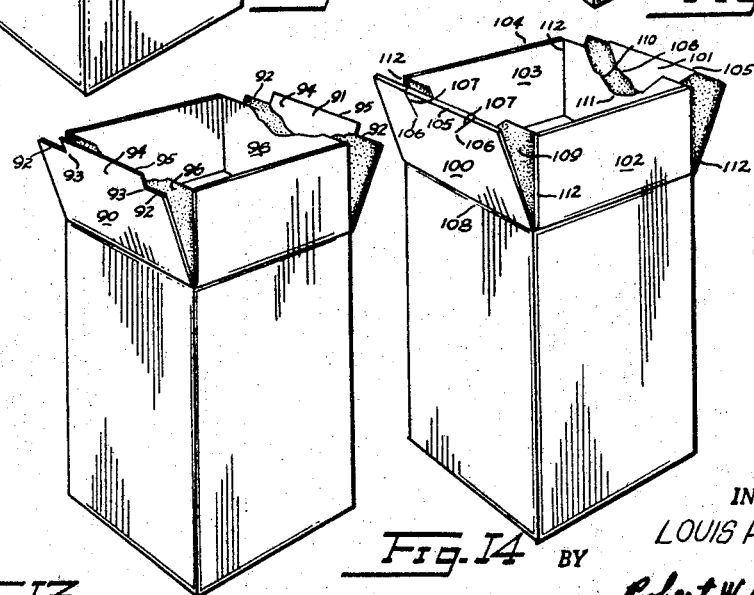
FIGURES 13 and 14 are perspective views of cartons showing additional embodiments of the invention.

In FIGURE 13 is disclosed a further modification wherein a first pair of opposed closure flaps 90–91 have the web defining cut lines 92 comprising free end edge portions of the closure flaps. Said cut lines 92 extend to points of termination 93 whereat the projecting tabs 94 extend outwardly as defined by free edges 95. In this embodiment the delamination of the sealing webs 96 is initiated and controlled by the cut lines 92 and points of termination 93 as the initiation of tearing of the sealing web edge necessarily occurs at this point of deviation in the flap edge and thus there is gained a like result as described in conjunction with FIGURES 1 through 9.

In FIGURE 14 is disclosed an embodiment wherein the first pair of opposed closure flaps 100–101 and the alternate pair of closure flaps 102–103 may all be of substantially the same length whereby the paired end edges 104 of the opposed pair of closure flaps 100–101 and the paired end edges 105 will each be in respective abutting relation along a medial line in the closed position of the flaps. Thus the points of termination 106 of the cut lines 107 must necessarily be spaced from the respective flap score 108 a distance less than one-half the width of the flap. Nevertheless, the disposition of the sealing web defining cut lines 107 extending inwardly from the end edges 105 of the opposed pair of closure flaps 100–101 are disposed in a manner whereby upon the delamination of the sealing web 109, the converging torn free edges 110 will intersect at an apical point 111 spaced upwardly from the respective flap scores 108 whereby the sealing web 109 extends entirely across the carton and integrally connects the respective paired end edges 112 of the alternate pair of closure flaps 102–103.

Further embodiments of the invention are shown in FIGURES 15 through 19 and FIGURES 20 through 22 inclusive wherein the delamination of the sealing webs is completely controlled and defined by means of cut scores rather than being in part determined by torn free edges as in the hereinbefore described embodiments. The embodiment in FIGURES 20 through 22 further shows the provision of sealing fins in combination with the sealing web whereby an end closure may be attained which is capable of thermoplastic sealing to provide a liquid tight or hermetic seal of the carton.

More particularly referring to the blank 116 in FIGURE 16, there is shown a first opposed pair of wall panels 117 in foldably connected serial relation with an alternate pair of wall panels 118. Top closure flaps 119 are foldably connected to the top edges of the wall panels by flap scores 120. Similar bottom closure flaps 121 may be foldably connected to the bottom edges of the wall panels. The top closure flaps include a first opposed pair of closure flaps 122 which will constitute the outer closure flaps in the erected container. The alternate pair of closure flaps 123 are foldably connected at their side edges to said first pair 122 by cut scores 124 which sever the outer surface of the blank leaving an integral connection between the adjacent side edges of said flaps throughout their extent from the flap scores 120 to the free end edges 125. The first opposed pair of closure flaps 122, which will constitute the outer closure flaps in the erected container, are further provided with a continuous line of cut scoring 126 in the inner surface of the flaps which extends in inwardly spaced relation from the flap side edge cut scores 124 and flap bottom edge defined by the flap scores 120 and extends outwardly to the flap free edges 125, thus defining a generally converging sealing web upper edge similar to the hereinbefore described constructions and as shown in FIGURE 16.

A sealing flap 127 is connected to one side edge of the blank whereby the carton may be erected to tubular relation and the sealing flap 127 secured to the opposed side margin to form the container as shown in FIGURE 17 wherein the bottom closure flaps 121 are infolded. Preparatory to infolding the top closure flaps 119, the first opposed pair of closure flaps are folded outwardly about their flap scores 120 to delaminate the sealing webs 128 as shown in FIGURE 18. In this embodiment, the delamination initiates along the cut lines 129 which constitute portions of the free end edges 125 of the flaps intervening the flap side edge cut scores 124 and the sealing web defining line of cut scoring 126 and thus the point of termination 130 of the cut lines 129 is disposed at the ends of the line of cut scoring 126.

Figure 18A:
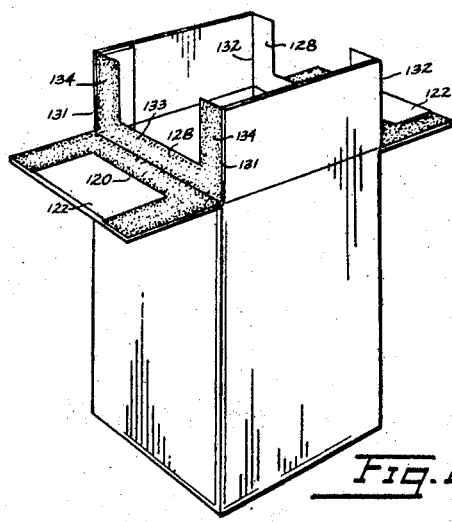

In FIGURE 18A the opposed flaps 122 are folded outwardly to horizontal disposition to show the integral connection by means of the sealing web 128 between the respective paired side edges 131 and 132 of the alternate pair of closure flaps 123 through the medium of the sealing web 128 which is continuous across the width of the carton and extends upwardly from the flap score 120. The sealing web thus comprises a central portion 133 extending along the flap score 120 and end portions 134 extending along the respective edges 131–132 of the alternate pair of flaps.

Figure 19:
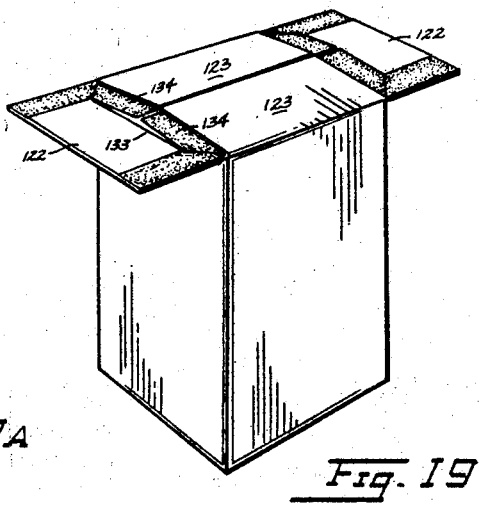

The infolding of the alternate pair of closure flaps 123 as shown in FIGURE 19 wherein the end portions 134 of the sealing web are folded into flatwise substantially coextensive relation with the central portion 133 to form an effective two ply sealing web extending completely across the carton whereupon the infolding of the first pair of closure flaps 122 in the hereinbefore described manner will result in an effective sealing of the carton.

Figure 20:
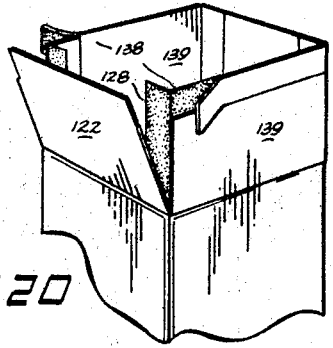
FIGURES 20 through 22 are perspective views showing successive stages of assembly of a modified version of the carton construction shown in FIGURES 17 through 19.
Figure 21:
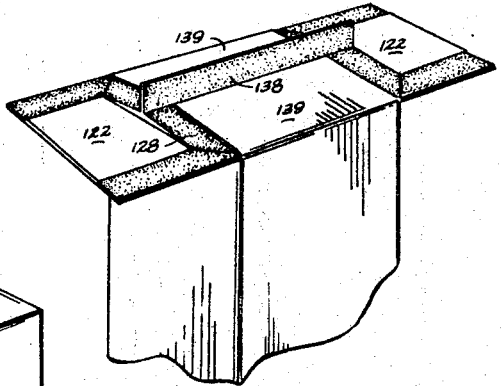
Figure 22:
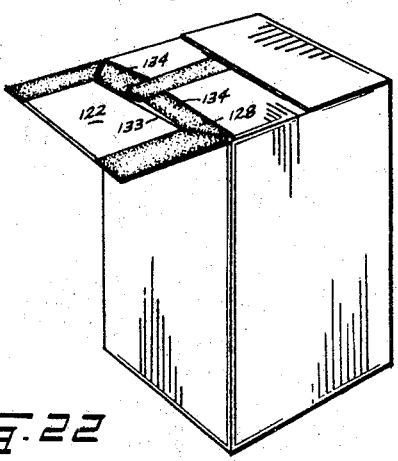

For the purpose of maximum protection of the container contents, particularly in the instance of fluid materials or materials requiring hermetic seal, sealing fins 138 may be provided along the end edges of the alternate pair of closure flaps 139 as shown in FIGURES 20 through 22 inclusive. Such sealing fins 138 are preferably provided in the same manner as described in conjunction with FIGURES 10 through 12 inclusive but in this case there is shown the provision of paired sealing fins extending from the end edges of each one of the alternate pair of closure flaps 139 whereby such sealing fins may be secured together as disposed in FIGURE 21 by means of adhesive or thermoplastic sealing which sealing may also extend into the end portions 134 and central portion 133 of the sealing web 128 as disposed in FIGURE 22 whereby a complete and effective seal is gained even preparatory to the infolding of the first opposed pair of closure flaps 122. However if adhesive or thermoplastic sealing is not undertaken an effective seal will be gained upon the completion of the infolding of the closure flaps in the manner hereinbefore described.

It is to be noted that in each of the hereinbefore described variations of sealed carton constructions in accordance with the invention there are provided a sealing web formed from the inner surfaces of a first pair of opposed flaps which sealing webs extend between and integrally connect the paired end edges of the alternate pair of opposed flaps. The sealing webs in each case have an upper free edge which is particularly determined and controlled by cut lines in at least the inner surface of said alternate pair of opposed flaps whereby the upper free edge has a configuration converging downwardly and inwardly from the flap edges to an apical zone at the midwidth of the flaps. This apical portion is such that, while it is necessarily spaced above the flap score, it will result in a slightly truncated triangular configuration of the folded sealing web and there is thus an avoidance of intersection of the end portions of the sealing web at said apex which would result in an undesirable crimping with a resulting deleterious effect on the sealing properties thereof. An important property of the sealing web is that they be integrally connected to the end edges of an alternate pair of opposed flaps while being delaminated from but connected to at least the flap score connection of the first pair of opposed flaps and that the end portions of the sealing web be folded upon and be coextensive with the central portion thereof throughout the width of the carton.

It is to be understood that the embodiments of the invention herein described are illustrative and not restrictive and the invention may be susceptible to embodiment in other modified forms, and that all such modifications which are similar to or equivalent hereto come equally within the scope of the claims next appearing.

In the claims:

1. A sift proof container formed from a foldable fibreboard blank and having tubularly arranged wall panels and closure flaps on at least one end of the container, the flaps including an innermost pair in opposed relation and an outermost pair in opposed relation with each such flap connected by a flap fold to one end of a respective wall panel, said flaps having side edges defined by lines of severance in the outer surface and in foldably connected relation on the interior surface thereof throughout their adjacent extent prior to infolding to closing relation, the flaps comprising the innermost pair having free end edges in abutting relation at the container midwidth, sealing webs separated from the interior surface of the outermost flaps by tearing of the fibreboard and having a free edge initiated at the free end edge of the adjacent innermost flap, said sealing webs connecting the side edges of the innermost flaps throughout their extent to adjacent portions of a respective one of the outermost flaps to provide a seal extending entirely across the container at the innermost flap side edges, the sealing webs each being folded on itself with end portion free edges at least intersecting at the container midwidth to completely close the end of the container and prevent sifting of the contents through said closure.

2. A container as set forth in claim 1 wherein the outermost pair of flaps are provided with cut lines on at least the inner surfaces thereof, said cut lines extending inwardly from the side edges of each said flap at points spaced from the flap scores substantially one-half the carbon width, the cut lines defining in part free outer edges of the sealing webs.

3. A container as set forth in claim 1 wherein the outermost pair of flaps are provided with cut scores on the inner surface thereof, said cut scores being substantially U-shaped and in inwardly spaced relation to the respective flap side edges and flap fold and defining the sealing web upper edge.

4. A container as set forth in claim 1 wherein the outermost pair of flaps are each provided with cut lines comprising free end edge portions of the flap, said cut lines extending inwardly from the side edges of the flaps, projecting tabs with free edges extending outwardly from the flap whereby delamination of the sealing web is determined by the point of intersection of the extending tab free edges and the innermost end of said cut lines.

5. A sift proof container having tubularly arranged wall panels and end closure flaps connected to at least one end of the container by flap folds, the flap folds each being substantially coextensive with the width of the respective wall panel, the flaps having side edges defined by lines of cut score throughout their adjacent extent, the cut scores being in the outer surface thereof and extending to but not through the inner face of the flap and such cut scores extending outwardly from the flap folds to the marginal ends of the flaps, a first pair of closure flaps, the length of which is ½ the container width, a second pair of opposed flaps having cut lines in at least the inner surface thereof, said cut lines extending inwardly from the side edges of each said flap at points spaced from the respective flap fold and initiating at the end edge of the juxtaposed flap, said cut lines defining in part a free outer edge of a delaminable sealing web portion of the inner surface of said second flaps, said free outer edge of said sealing web when delaminated from its flap by a force transmitted thereto by inward movement of said first flap forming downwardly and inwardly converging portions at least butting together at a central zone of the respective first flap in spaced relation to the flap fold, to completely close the end of the carton and prevent sifting of the contents through said closure.

6. A container as set forth in claim 5, wherein the sealing web is folded upon itself in a substantially triangular configuration having a central portion and end portion folded thereover with the end portions in mutual overlapping relation.

7. A container as set forth in claim 5, wherein the cut lines extend inwardly in converging relation from the end edges in each of the respective flaps.

8. A container as set forth in claim 5, wherein said cut lines constitute portions of the free end edge of the flaps.

9. A container as set forth in claim 5 further provided with a cut score initiating at the inner ends of the cut lines and extending in continuous relation in a downwardly and inwardly converging relation defining the free edge of the sealing web.

References Cited by the Examiner
UNITED STATES PATENTS 2,523,488  9/50  Williamson _____ 229—37
3,094,265  6/63  Hovland _____ 229—37

FRANKLIN T. GARRETT, *Primary Examiner.*

EARLE J. DRUMMOND, *Examiner.*